(No Model.)
M. WOODHULL.
VEHICLE BODY.
No. 602,550. Patented Apr. 19, 1898.
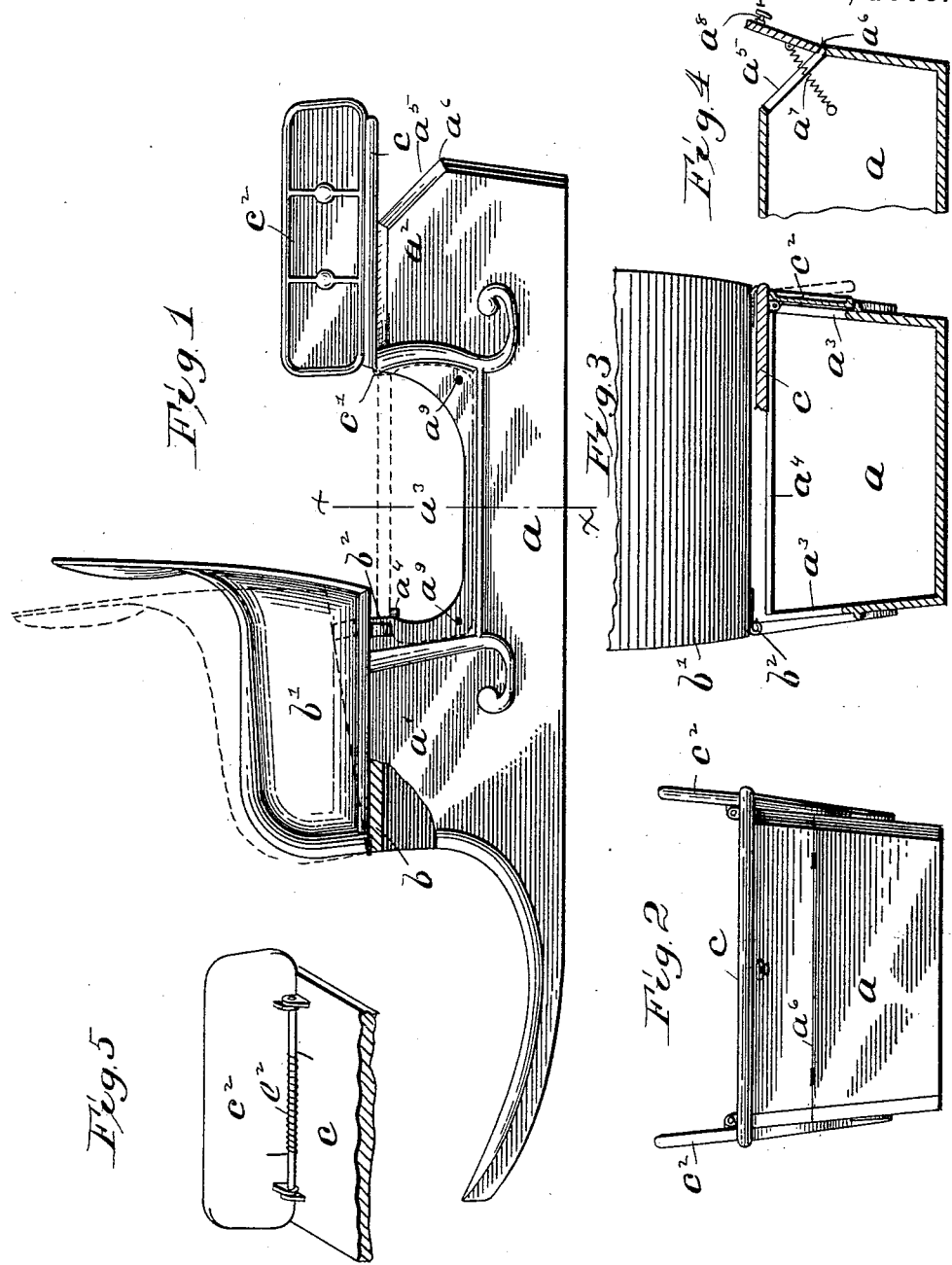
Witnesses
G. M. Gridley
Chas. I. Welch
Inventor
Morris Woodhull
By his Attorney

UNITED STATES PATENT OFFICE.

MORRIS WOODHULL, OF DAYTON, OHIO.

VEHICLE-BODY.

SPECIFICATION forming part of Letters Patent No. 602,550, dated April 19, 1898.

Application filed February 1, 1898. Serial No. 668,785. (No model.)

*To all whom it may concern:*

Be it known that I, MORRIS WOODHULL, a citizen of the United States, residing at Dayton, in the county of Montgomery and State of Ohio, have invented certain new and useful Improvements in Vehicle-Bodies, of which the following is a specification.

My invention relates to improvements in vehicle-bodies, and especially to the bodies of that class of vehicles having what are known as "jump seats" or "shifting seats," or to that class known as "turnover vehicles."

The objects of my invention are to provide in vehicles of this class a body so constructed that a rear seat equal to or greater than the greatest width of the body proper may be used, to provide a body simple in construction and automatic in operation, and to provide a body artistic in form and having a large carrying capacity in proportion to the space taken up. I accomplish these objects by the constructions shown in the accompanying drawings, in which—

Figure 1 is a side elevation of a vehicle-body embodying my invention, the front seat being shown by dotted lines in a partially-raised position to show more clearly the location of some of the parts. Fig. 2 is a rear view of a vehicle-body, showing the construction and arrangement of the ends of the rear seat. Fig. 3 is a sectional view looking toward the front of the body, taken on line $x\ x$ in Fig. 1, the rear seat being turned down out of position for use. In this view some of the parts are broken away to show the position of the rear-seat ends. Fig. 4 is a side sectional view of the rear of the body, showing the luggage-door. Fig. 5 is a detail in perspective of a portion of the rear seat.

Like parts are represented by similar letters of reference in the several views.

In said drawings, $a$ represents the body proper, the sides of which are preferably formed as shown in Fig. 1 and secured to the floor of the body at an angle, so that the sides are flaring, as shown in Figs. 2 and 3. The sides are preferably cut away in the center, as shown at $a^3$, thus forming at the front and rear elevated parts $a'$ and $a^2$, the opposite body sides being connected at the top of these elevated parts, thus forming the box or body proper. To the top of the body or deck $b$, connecting the front side portions $a'$, the front seat $b'$ is hinged in any suitable manner, but adapted to normally rest on the deck $b$. This seat may be of any desired style or size; but I prefer to make it a little longer than the width of the top of the body. To the front edge of the rear deck the rear seat is hinged, as shown at $c'$. I preferably make this seat the same length as the front seat, and it is adapted when in position for use to rest on the deck or side portions $a^2$.

I provide the rear seat with hinged ends or panels $c^2$, having springs $e^2$ so arranged that they will keep the end pieces standing at an angle to the seat and at an angle to the perpendicular, with their tops projecting out beyond the seat $c$, as shown in Fig. 2. The end pieces are formed with rounded corners and are made slightly longer than the width of the seat-piece $c$, so that they will extend beyond the seat at each end.

The rear seat $c$ is made so that when it is swung forward it will almost fill the space between the two decks, the rear of the front seat being adapted to extend over the edge of the rear seat when the latter is swung forward and thus completely close the space and form a continuous deck behind the front seat.

On the under side of the front deck $b$ I secure a plate $a^4$, which preferably extends across the body. This plate projects far enough from the deck to form a support for the rear seat when in its forward position. In this position the rear seat $c$ stands slightly below the forward deck, so that the front seat will not contact therewith.

When the rear seat is in its forward position, the hinged ends $c^2$ are adapted to cover the openings $a^3$ in the sides of the body.

In order to preserve the symmetry of the body when the rear seat is forward, I form an ornamental design on the body sides by an extended rib around the openings $a^3$ and within which the seat ends are adapted to extend and form a part of said design.

When the rear seat is closed, the hinged ends $c^2$ extend some distance under the front seat, as shown by dotted lines in Fig. 1, and there are secured to the under side of the front seat projections $b^2$, preferably yielding, in the nature of springs, which are adapted to bear against the tops of the hinged seat ends and press them inwardly, so that they will lie close to the body proper.

In the drawings I have shown the engaging projections $b^2$ each formed of a flat metallic bar curved at its outer end to form a yielding portion or spring. It is obvious, however, that any suitable construction or material may be employed to form a yielding engagement, or the projections may be solid or unyielding, if desired.

To prevent marring or rattling of the parts, I preferably employ yielding bumpers $a^9$, of rubber or other suitable material, between the body sides and the hinged seat ends.

The rear seat when up is adapted to project over the rear of the body, the top of the body being beveled off at the rear, as shown at $a^5$, and I preferably hinge this beveled part at $a^6$ to form a door, which is kept in a closed position by means of a suitable spring $a^7$. It may be provided with a handle $a^8$ of any suitable form.

In order to change my vehicle-body from a two-seated to a one-seated rig, the front seat is slightly raised a little forward, and the rear seat may then be turned forward, and when the front seat is again in position the swinging ends of the rear seat are automatically closed in position by the engaging parts on the front seat.

Having thus described my invention, I claim—

1. The combination in a vehicle-body having two hinged seats each adapted to be swung forward and backward, the rear seat having hinged portions adapted, when in its forward position to lie outside of and substantially parallel to the sides of the body proper, as and for the purpose specified.

2. The combination in a vehicle-body having two hinged seats with a space between them, each adapted to be swung forward and backward, the rear seat being wider than the space between the seats, hinged ends on said rear seat adapted to lie outside of and at an angle to the body proper, and means for pressing said end pieces yieldingly against the body sides when the front seat is in position, substantially as specified.

3. The combination in a two-seated vehicle-body both seats being hinged in front, the rear seat being longer than the width of the body proper and wider than the distance between said seats, of hinged ends for said rear seat adapted to stand outside of the body and to be pressed in toward it when the front seat is down by means of an engaging projection, substantially as specified.

4. The combination in a vehicle-body having two seats one in the front and one in the rear, the rear seat being longer than the width of the body proper, of hinged ends for said seat, of a yielding projection on said front seat adapted to lie against said hinged ends when said seat is swung forward, substantially as specified.

5. The combination in a vehicle-body having a front and rear seat hinged as described said rear seat being longer than the width of the body proper; of end pieces for said seat hinged and adapted, when said seat is forward, to lie in close proximity to and outside of the body proper, of raised decorations on said body adapted, with said seat ends to form an ornamental design, as and for the purpose described.

6. In a vehicle-body having a hinged rear seat as described the combination with a box under said seat, of a beveled top for said box having a hinged door therein and a spring secured to said door to keep the same in a closed position, substantially as specified.

In testimony whereof I have hereunto set my hand this 28th day of January, A. D. 1898.

MORRIS WOODHULL.

Witnesses:
J. C. TYSON,
ROSCOE SHANK.